(12) United States Patent
Liu

(10) Patent No.: US 9,156,486 B2
(45) Date of Patent: Oct. 13, 2015

(54) FOLDING MECHANISM FOR SUPPORTING TABLE MACHINE

(71) Applicant: DURQ MACHINERY CORP., Taichung (TW)

(72) Inventor: Chia-Sheng Liu, Taichung (TW)

(73) Assignee: DURQ MACHINERY CORP., Taichung (TW)

( * ) Notice: Subject to any disclaimer, the term of this patent is extended or adjusted under 35 U.S.C. 154(b) by 5 days.

(21) Appl. No.: 14/187,945

(22) Filed: Feb. 24, 2014

(65) Prior Publication Data
US 2015/0191187 A1 Jul. 9, 2015

(30) Foreign Application Priority Data
Jan. 7, 2014 (TW) .............................. 103100541 A

(51) Int. Cl.
*B62B 1/12* (2006.01)
*F16M 11/42* (2006.01)

(52) U.S. Cl.
CPC . *B62B 1/12* (2013.01); *F16M 11/42* (2013.01)

(58) Field of Classification Search
CPC ........ B62B 1/12; B62B 1/26; B62B 2205/06; B62B 5/049
USPC ............. 280/638, 35, 639, 38, 641, 645, 649, 280/651, 652, 47.18, 47.2
See application file for complete search history.

(56) References Cited

U.S. PATENT DOCUMENTS

| 6,695,324 B1 * | 2/2004 | Wu ........................ 280/47.315 |
| 7,255,355 B2 * | 8/2007 | Chisholm et al. ............... 280/30 |
| 7,681,893 B2 * | 3/2010 | Liu et al. ......................... 280/35 |

* cited by examiner

Primary Examiner — J. Allen Shriver, II
Assistant Examiner — Bryan Evans
(74) Attorney, Agent, or Firm — Muncy, Geissler, Olds & Lowe P.C.

(57) ABSTRACT

A folding mechanism operatable between an extended position and a received position is disclosed to include a rack for supporting thereon a table machine, a pair of first legs and a pair of second legs respectively pivoted to the rack for supporting the rack above the floor, two first links respectively pivoted to the rack, two sliding units slidably and respectively sleeved onto the first legs and pivotally and respectively connected with the first links, and two second links respectively pivoted to the sliding units and the second legs. The first and second links and the sliding units are moved with the second legs toward the first legs upon folding the folding mechanism from the extended position to the received position, and at the same time the sliding units are slid along the first legs, assuring safety and stability of the folding action.

7 Claims, 17 Drawing Sheets

US 9,156,486 B2

FOLDING MECHANISM FOR SUPPORTING TABLE MACHINE

CROSS-REFERENCE TO RELATED APPLICATIONS

This application claims priority from Taiwan Patent Application No. 103100541 filed on Jan. 7, 2014, the entire content of which is incorporated herein by reference.

BACKGROUND OF THE INVENTION

1. Field of the Invention

The present invention relates generally to foldable support means for supporting a table machine, and more particularly, to a folding mechanism for supporting a table machine, which can effectively convert the weight of the table machine that is supported on the folding mechanism into a force necessary for folding the folding mechanism.

2. Description of the Related Art

Referring to FIGS. 1-3, a conventional mobile stand 2 for supporting a table machine, for example, table saw 1 is shown in these drawings. The mobile stand 2 comprises a platform 3 for carrying the table saw 1, a pair of first legs 4 each having one end respectively pivoted to the platform 3 by a pin 2a and connected to a handle 4a and the other end terminating in a bearing portion 4b for touching the floor, a pair of second legs 5 each having one end respectively and pivotally connected to the first legs 4 by a pin 2b and terminating in an extension 5b and the other end mounted with a wheel 5a, and a pair of connecting members 6 each having the two distal ends respectively pivoted to the platform 3 and the extension 5b of the second legs 5 by pins 2c and 2d. By means of the aforesaid arrangement, the mobile stand 2 can be alternately set between an extended position shown in FIG. 1 and a received position shown in FIG. 3.

The design of the aforesaid mobile stand 2 allows utilization of the weight of the table saw 1 to share the force F1 necessary for folding the mobile stand 2 into the received position. However, when the bearing portions 4b of the first legs 4 are stopped at the floor, the table saw 1 is kept in a tilted position, and the center of gravity W of the table saw 1 is offset from the pivot points, i.e. pins 2b, between the first legs 4 and the second legs 5 (see FIG. 2), if the grasp force F2 applied by the user to the handle 4a cannot sustain the downward pressure of the table saw 1, the second legs 5 will be forced to move toward the first legs 4 rapidly, and the elastic force of the springs 7 between the first legs 4 and the second legs 5 will accelerate the movement of the second legs 5 toward the first legs 4, resulting in a potential accident.

Further, when the mobile stand 2 is extended out, the shank 8a of each T-shaped lock member 8 is respectively inserted through a through hole 4c on each first leg 4 and a through hole 9a on a respective locating plate 9 that is respectively welded to each of the second legs 5 to lock the first legs 4 and the second legs 5, preventing movement of the second legs 5 toward the first legs 4. When the mobile stand 2 is in the received position, the shanks 8a of the T-shaped lock members 8 are respectively stopped at the extensions 5b of the second legs 5, preventing movement of the second legs 5 relative to the first legs 4. The T-shaped lock members 8 provide a locking and positioning function. However, it is difficult to align the through holes 4c of the first legs 4 with the through holes 9a on the locating plates 9 at the second legs 5. Further, the T-shaped lock members 8 must be pulled out of the locking position or pushed into the locking position when the mobile stand 2 is extended out or received. Further, a shearing force may be produced between the first legs 4 and the second legs 5 due to an accidental impact of the mobile stand 2, thereby damaging the T-shaped lock members 8.

Therefore, the aforesaid conventional mobile stand having the above-mentioned drawbacks is needed to be further improved.

SUMMARY OF THE INVENTION

The present invention has been accomplished under the circumstances in view. It is an objective of the present invention to provide a folding mechanism for supporting a table machine, which can effectively convert the weight of the table machine that is supported on the folding mechanism into a force necessary for folding the folding mechanism into a received position, assuring safe operation.

To attain the above-mentioned objective, a folding mechanism, which is adapted for supporting thereon a table machine and being alternatively settable between an extended position and a received position, comprises a rack for mounting of the table machine, a pair of first legs, a pair of second legs, two first links, two sliding units and two second links. The rack has a front end, a rear end, and a pair of first pivot points, a pair of second pivot points and a pair of third pivot points, which are orderly and spacedly arranged between the front end and the rear end. The first legs each have an end, namely a first end, pivoted to one of the first pivot points of the rack, and the other end, namely a second end, configured having a bearing portion and a stop portion for supporting on a floor. The second legs each have an end, namely a first end, pivoted to one of the second pivot points of the rack, and the other end, namely a second end, rotatably mounted with a wheel. The first links each have a first end pivoted to one of the third pivot points of the rack, and a second end. Each sliding unit is slidably sleeved onto one of the first legs and provided with a first pivot point pivotally connected with the second end of one of the first links, and a second pivot point. The second links each have an end, namely a first end, pivoted to the second pivot point of one of the sliding units, and the other end, namely a second end, pivoted to one of the second legs. When the folding mechanism is set in the extended position, the first legs and the second legs are kept in a crossed manner to hold the rack in a horizontal posture substantially. When the folding mechanism is moved from the extended position toward the received position, the first and second links and the sliding units are moved with the second legs toward the first legs. When the folding mechanism is set in the received position, the wheels are kept adjacent to the bearing portions of the first legs and the rack is kept in a vertical posture substantially.

In an embodiment of the present invention, each of the sliding units may comprise a main body and a pivot portion protruding outwardly from the main body. The main body is provided with a receiving space through which one of the first legs is inserted, and a contact surface configured matching the associated first leg. The pivot portion is provided with the first and second pivot points of the sliding unit.

In an embodiment of the present invention, the first and second pivot points of each of the sliding units may be coaxially aligned with each other.

In an embodiment of the present invention, each of the first links may define with the associated first leg a 90° contained angle when the folding mechanism is in the extended position.

In an embodiment of the present invention, the rack may comprise two transverse rods arranged in parallel, and first and second connecting rods parallel and fixedly arranged across the transverse rods for supporting the table machine. The first, second and third pivot points of the rack are formed on the transverse rods symmetrically and respectively. The first legs and the first links are respectively pivoted to the transverse rods at an outer side of the transverse rods. The second legs are respectively pivoted to the transverse rods at an inner side of the transverse rods relative to the first legs and the first links.

In an embodiment of the present invention, the first links may be substantially kept in parallel to the second legs and the second links may be substantially kept in parallel to the transverse rods when the folding mechanism is in the extended position.

In an embodiment of the present invention, the folding mechanism may further comprise a lock having a first hook portion for holding the first legs and the second legs in the crossed manner when the folding mechanism is in the extended position, and a second hook portion for holding the first legs and the second legs together when the folding mechanism is in the received position.

In an embodiment of the present invention, the lock may comprise a pedal, a retainer, a first bridge member and a second bridge member, wherein the pedal has one end pivotally connected with one of the second legs, and the other end configured having a press portion to be stepped by a user's foot. The retainer has an end, namely a first end, pivotally connected with the pedal, and the other end, namely a second end, configured having the first hook portion and pivotally connected with one of the second legs to be moveable in response to a pivotal motion of the pedal. Further, the retainer is provided with the second hook portion between the first and second ends thereof. The first bridge member has two ends fixedly and respectively mounted to the first legs, and the second bridge member has two ends fixedly and respectively mounted to the first links. The first hook portion is hooked on the first bridge member when the folding mechanism is in the extended position, and the second hook portion is hooked on the second bridge member when the folding mechanism is in the received portion.

In an embodiment of the present invention, the retainer of the lock may be provided at a portion that is pivotally connected with the second leg with an elongated guide groove.

By means of the above design of the present invention, the folding mechanism can effectively convert the weight of the table machine that is supported on the folding machine into the force necessary for receiving the folding mechanism 10. In addition, the folding action of the folding mechanism can be safely and stably operated because the sliding units are respectively and slidably sleeved onto the first legs.

Further scope of applicability of the present invention will become apparent from the detailed description given hereinafter. However, it should be understood that the detailed description and specific examples, while indicating preferred embodiments of the invention, are given by way of illustration only; since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
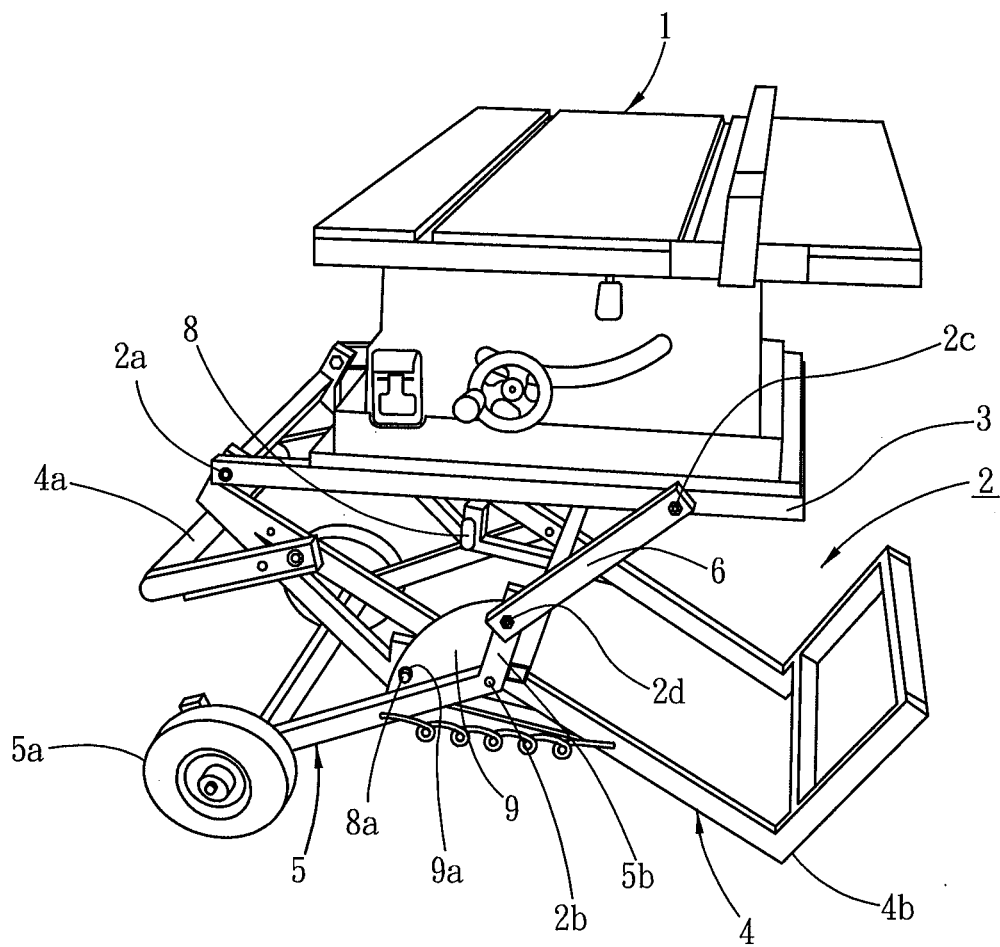
FIGS. 1-3 are perspective views of a mobile stand for a table machine according to a prior art, showing the operation of the prior art mobile stand from a extended status to a received status.
Figure 2:
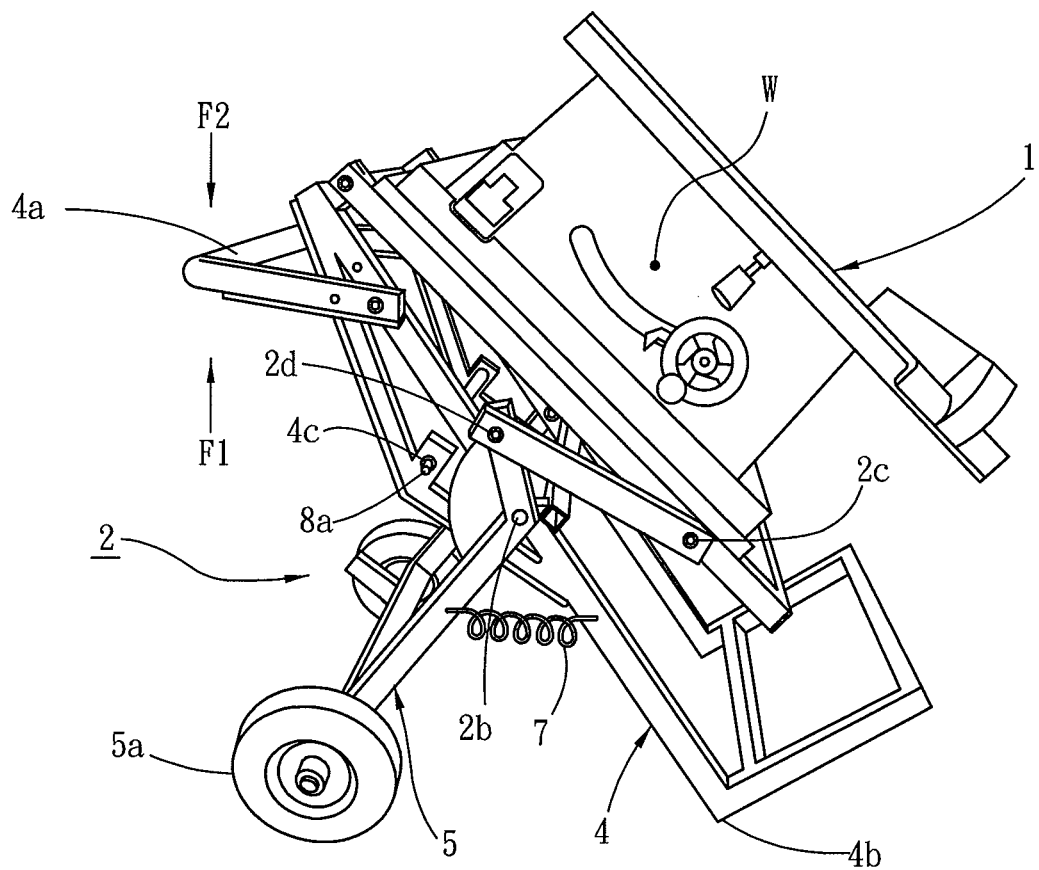
Figure 3:
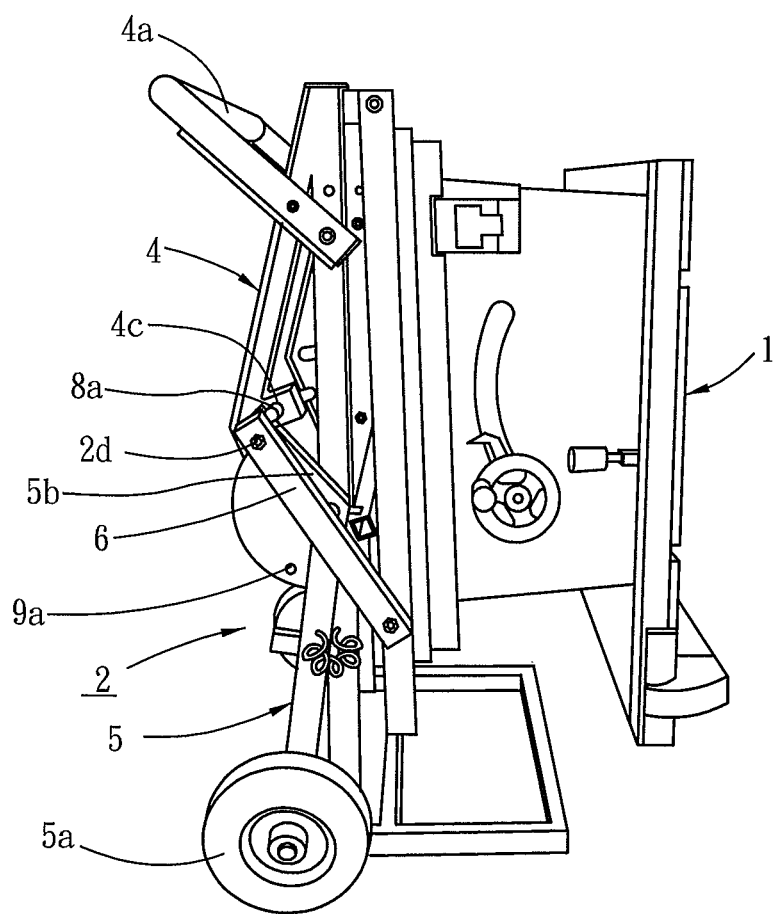
Figure 4:
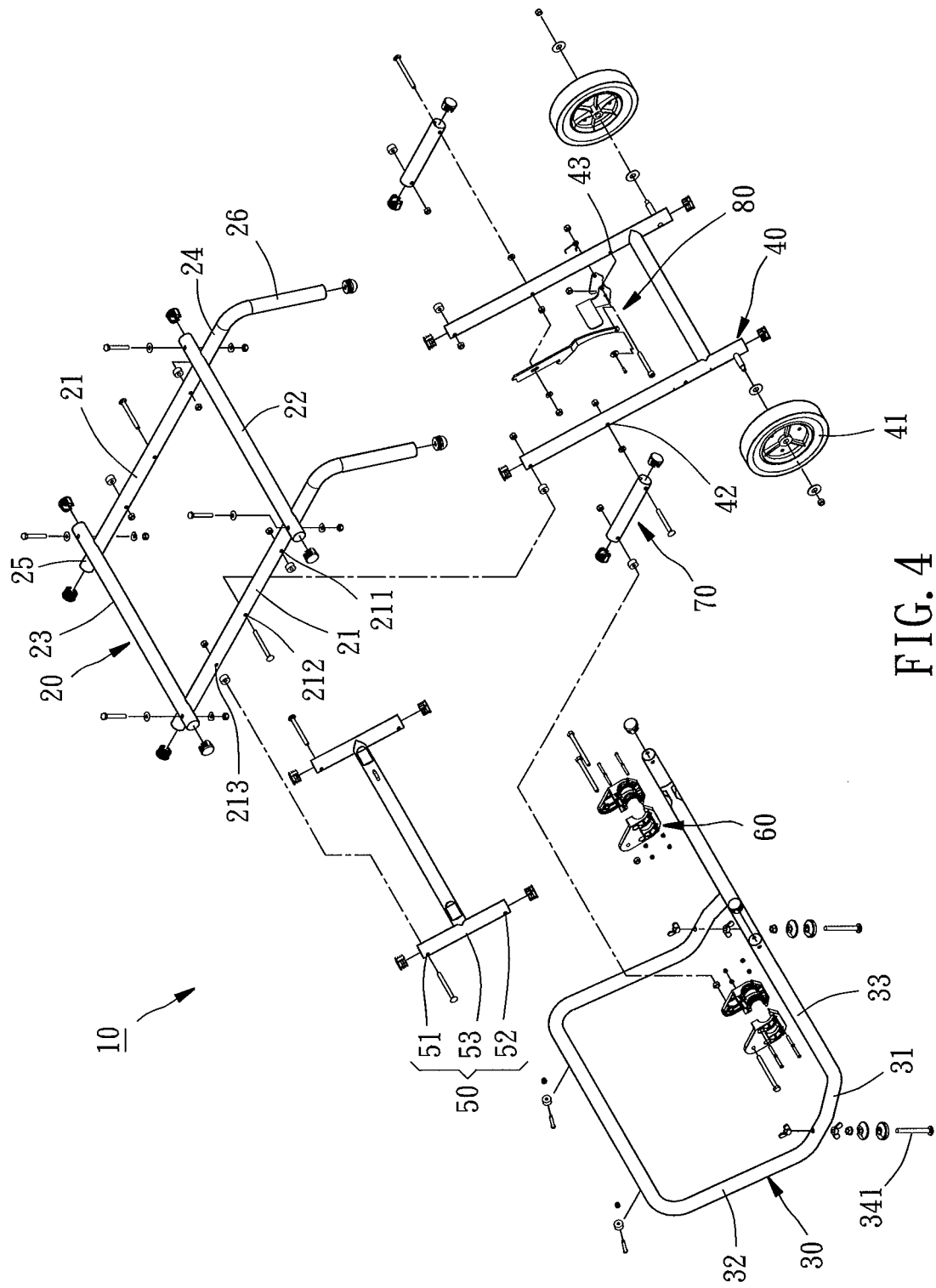
FIG. 4 is an exploded view of a folding mechanism for supporting a table machine in accordance with a preferred embodiment of the present invention.
Figure 5:
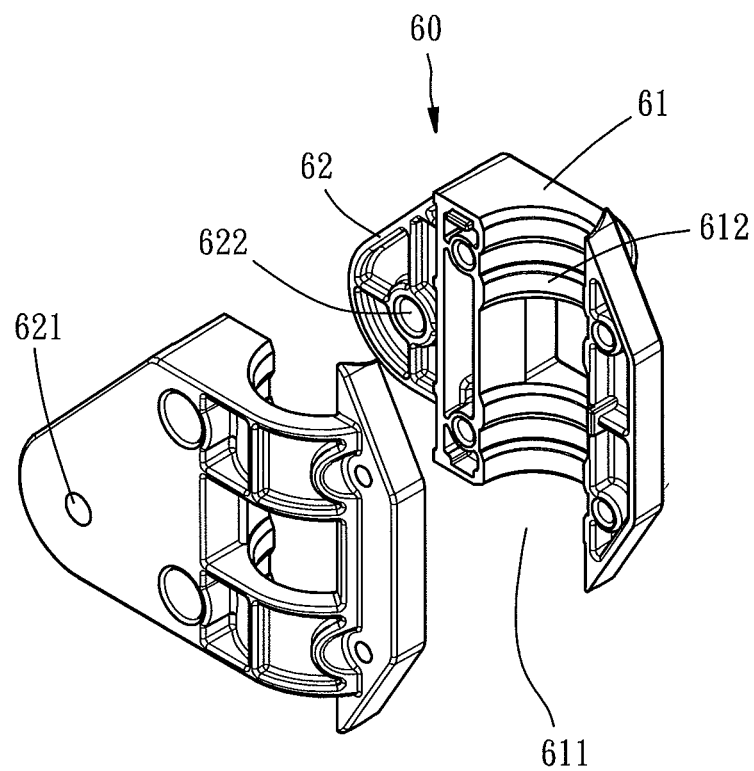
FIG. 5 is an enlarged perspective view of a sliding unit of the folding mechanism shown in FIG. 4.
Figure 6:
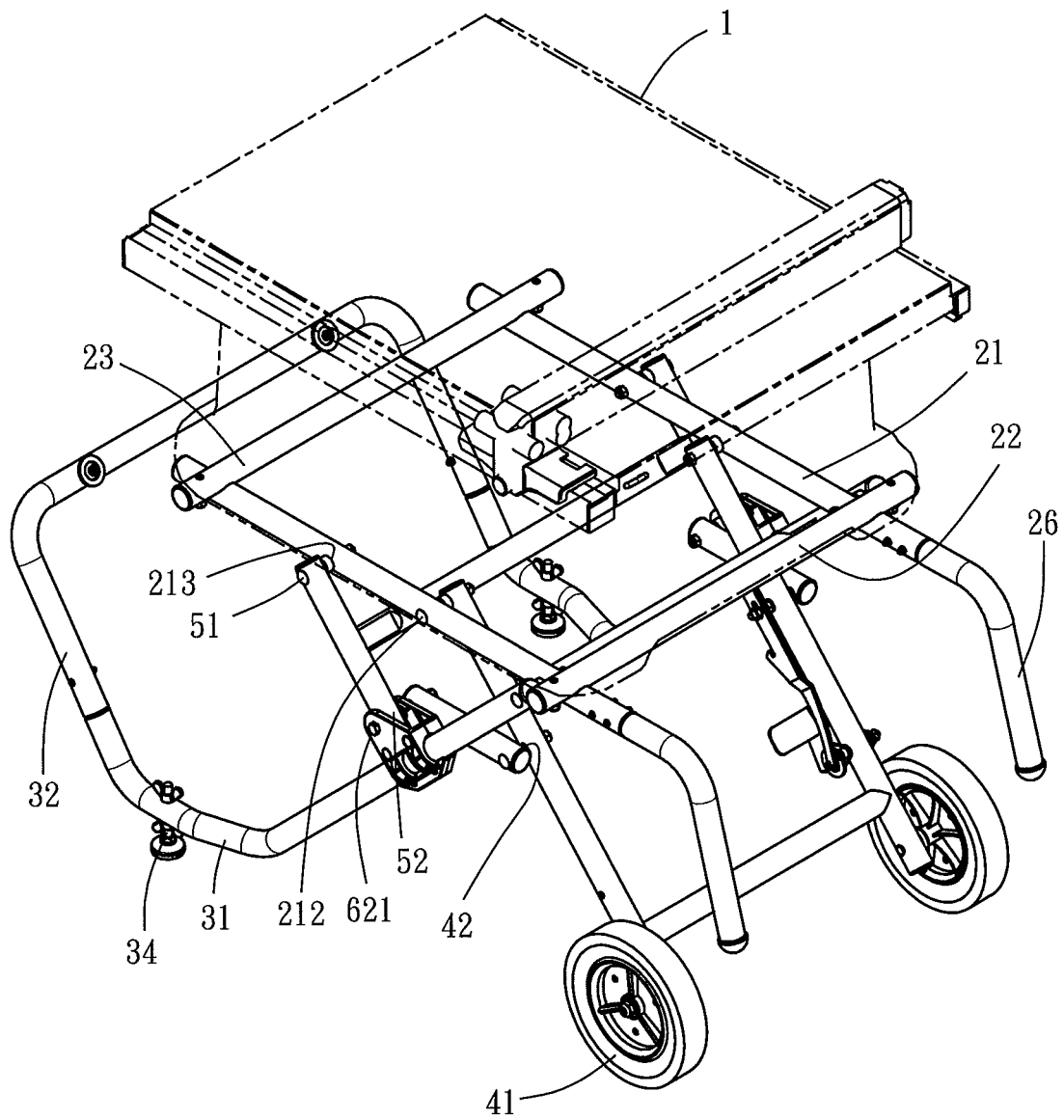
FIG. 6 is a perspective assembly view of the folding mechanism in accordance with the preferred embodiment of the present invention.
Figure 7:
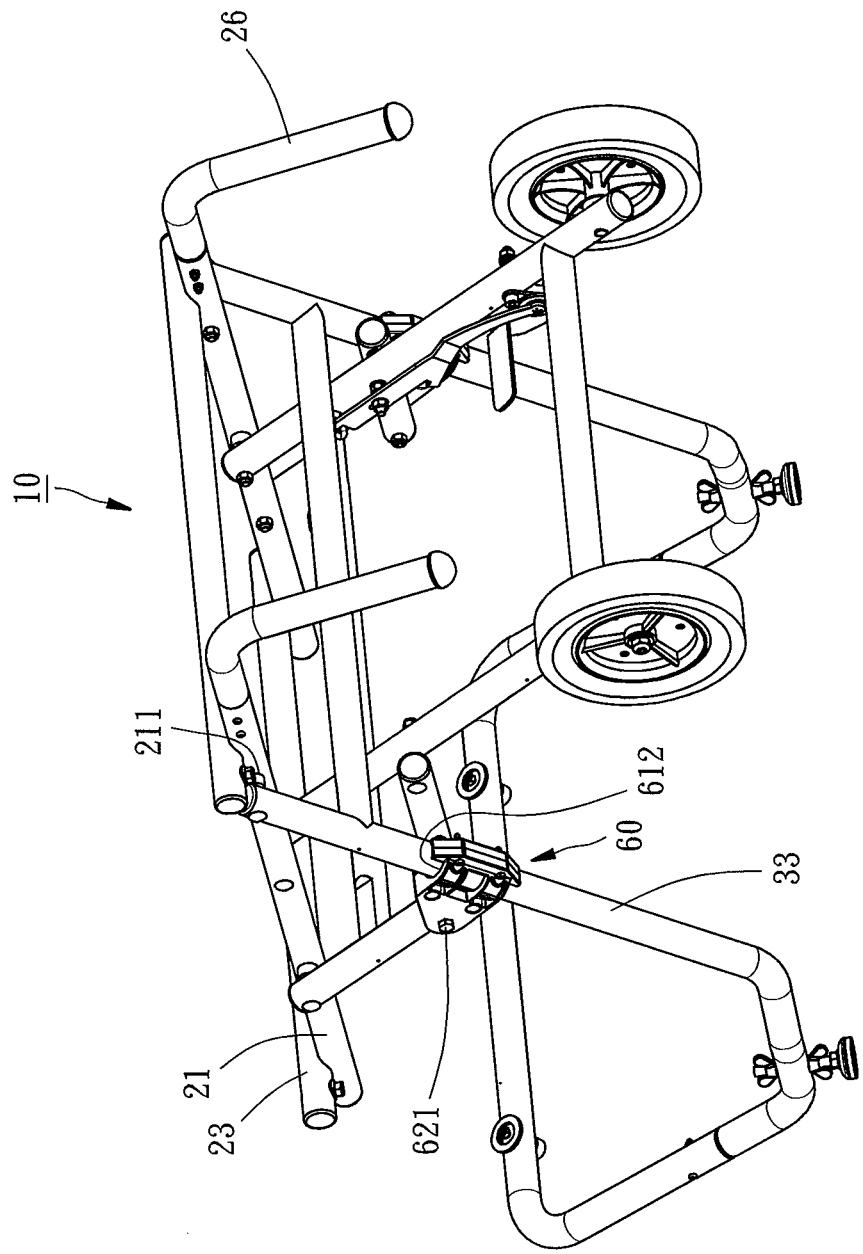
FIG. 7 is another perspective assembly view of the folding mechanism in accordance with the preferred embodiment of the present invention, which is viewed from another angle of FIG. 6.
Figure 8:
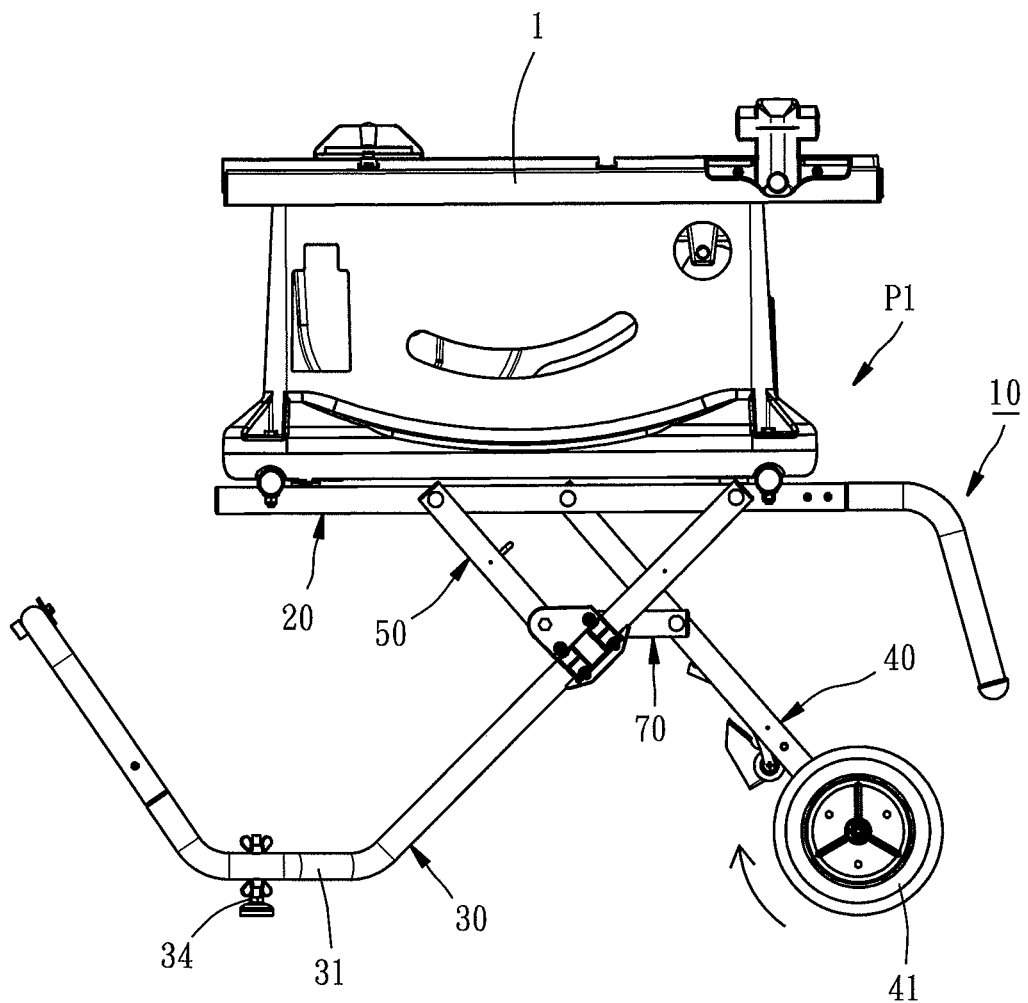
FIGS. 8-11 are schematic lateral side views of the folding mechanism of the preferred embodiment of the present invention, showing the operation of the folding mechanism from an extended position to a received position.
Figure 9:
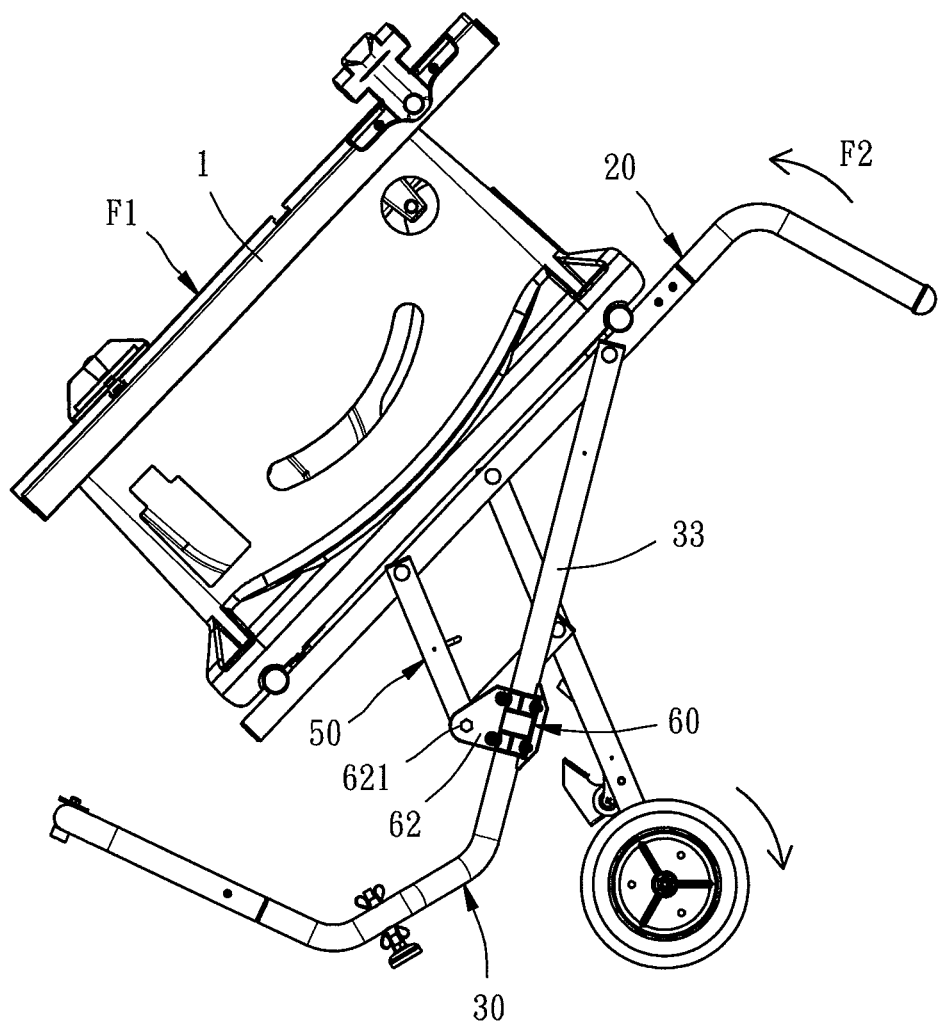
Figure 10:
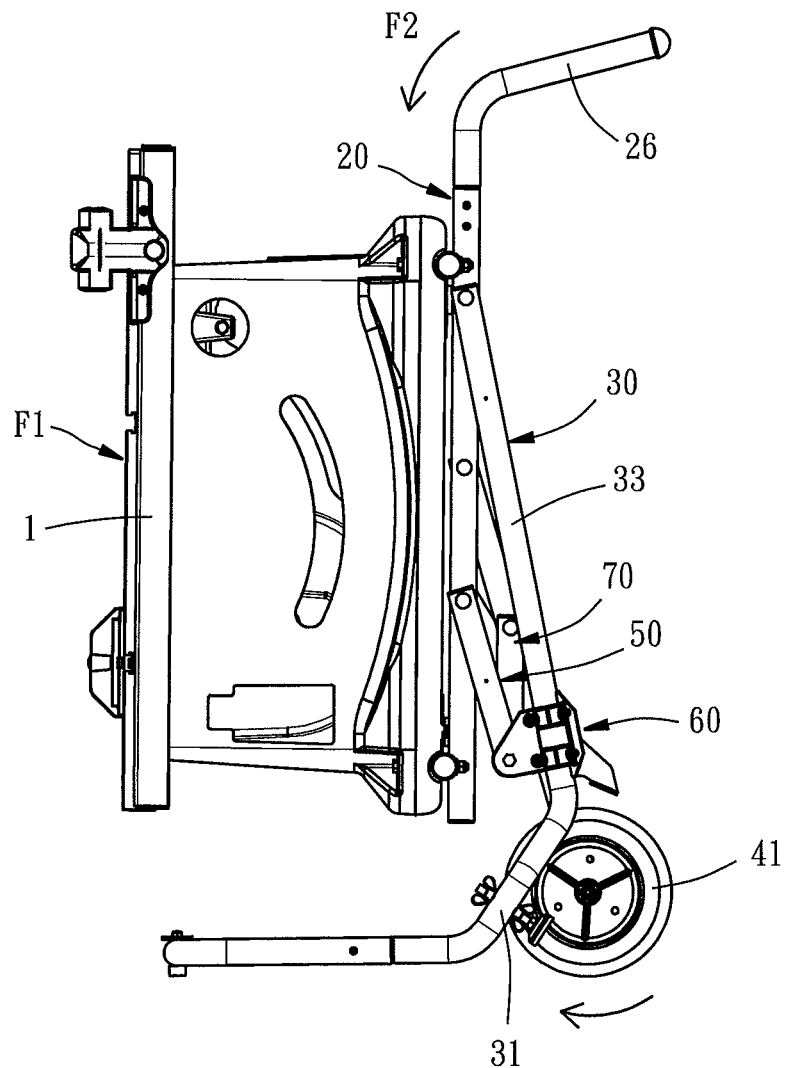
Figure 11:
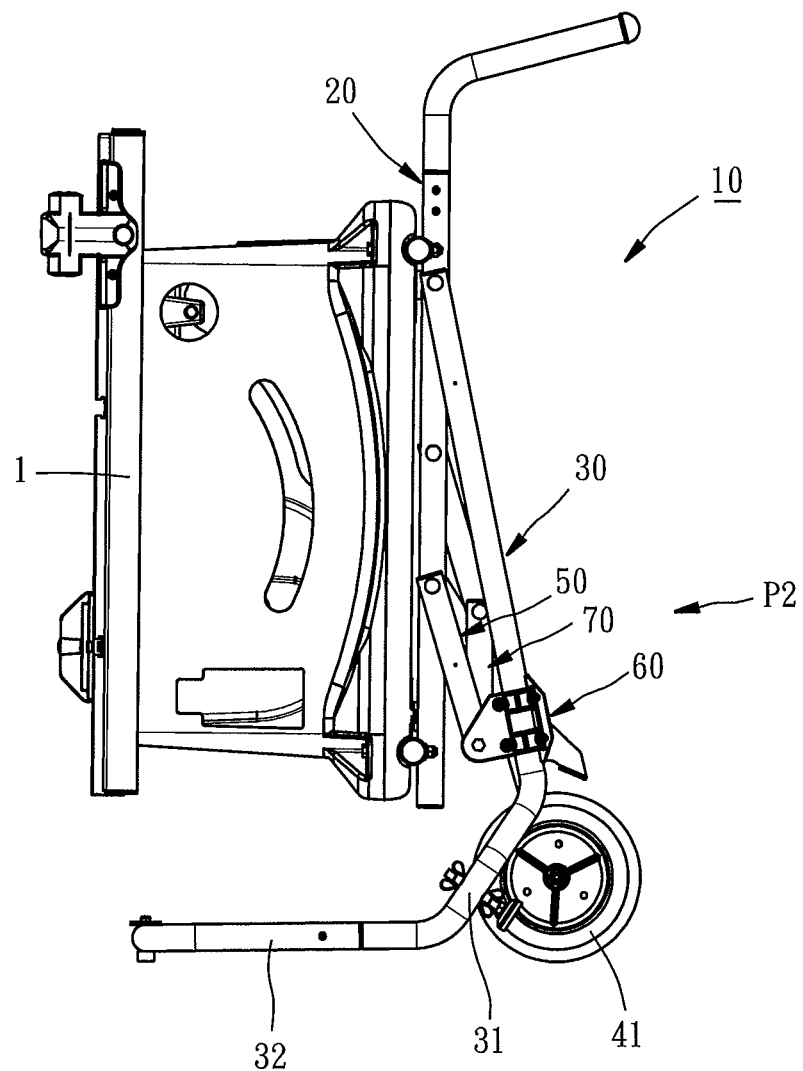
Figure 12:
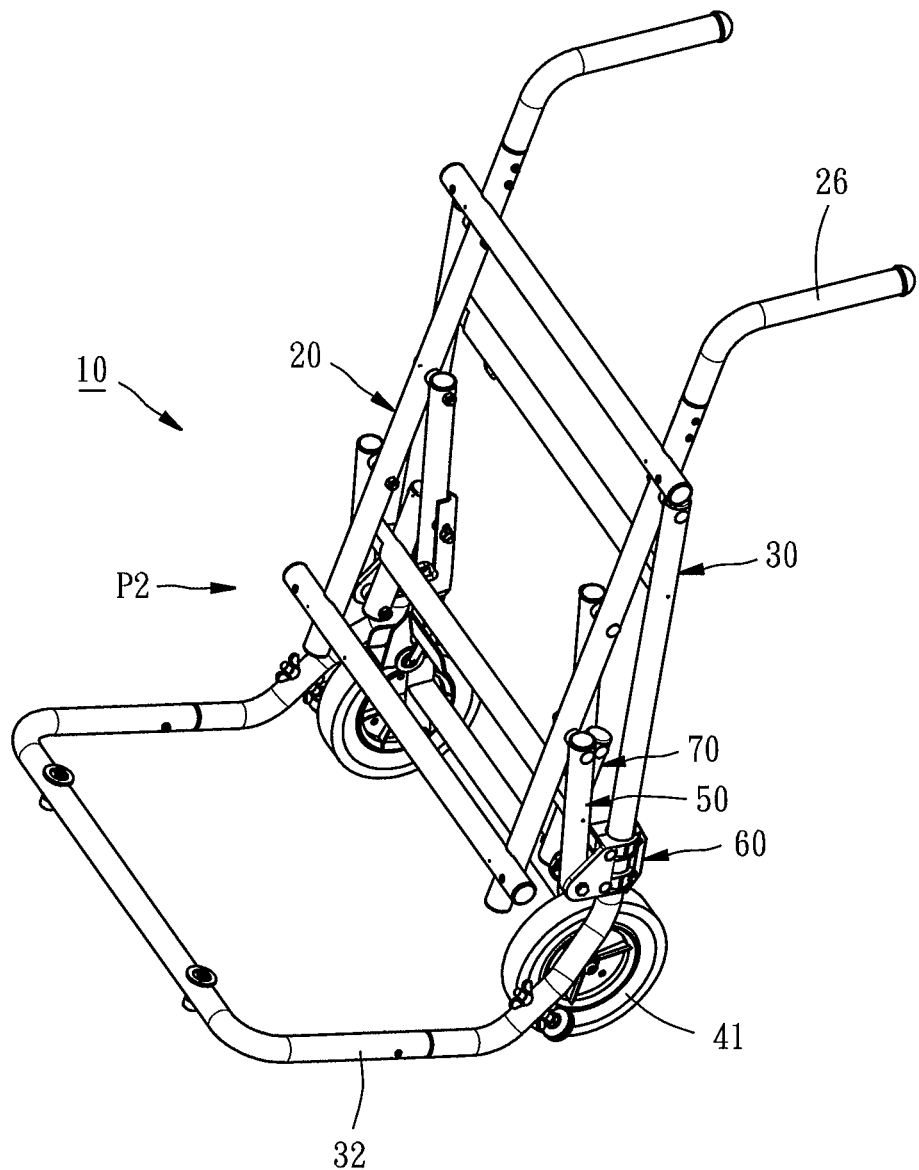
FIG. 12 is a perspective view of the folding mechanism of the preferred embodiment of the present invention, showing the folding mechanism is set in the received position.
Figure 13:
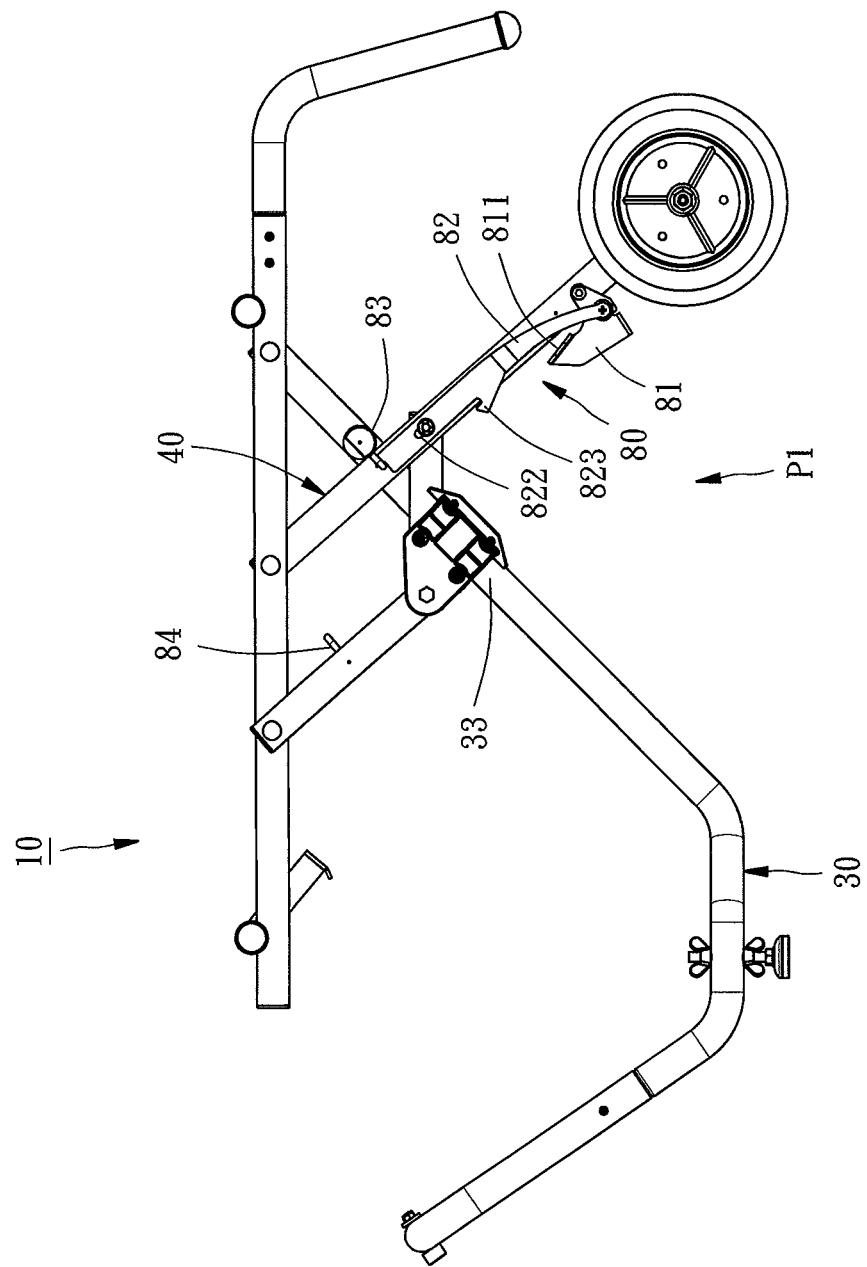
FIGS. 13-17 are schematic lateral side views of the folding mechanism of the preferred embodiment of the present invention, showing the operation of a lock of the folding mechanism when the folding mechanism is operated to be folded from the extended position to the received position, wherein some parts of the folding mechanism are removed for concisely illustrating the lock.
Figure 14:
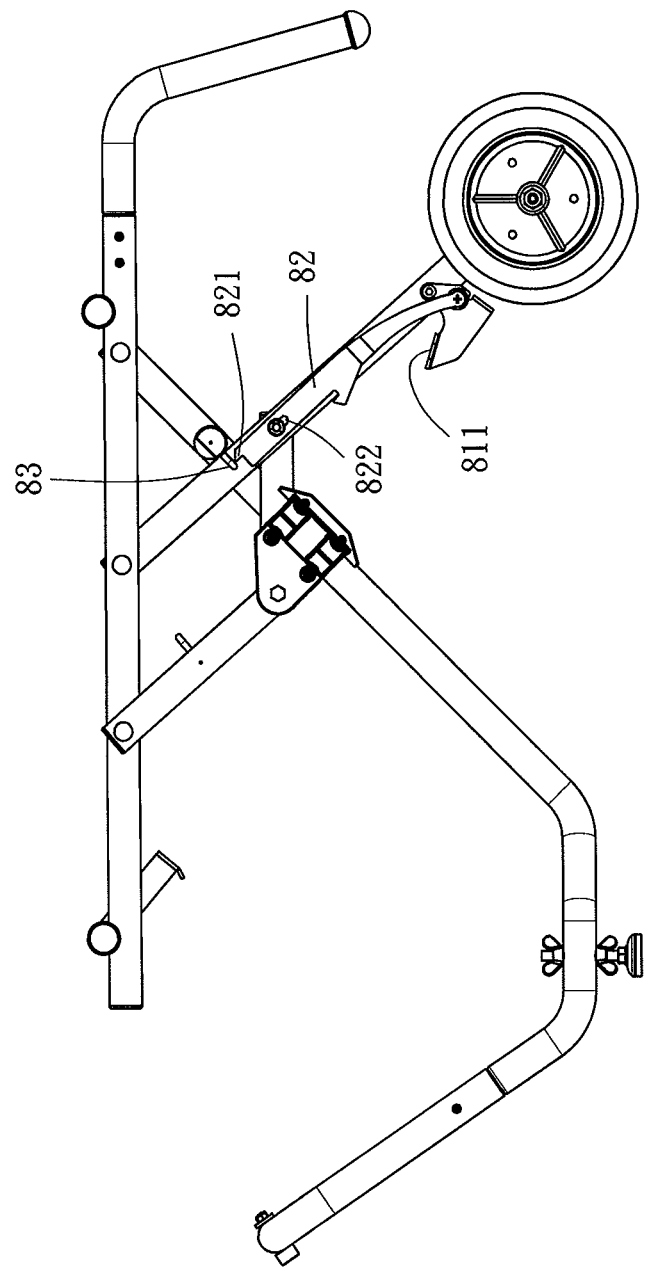
Figure 15:
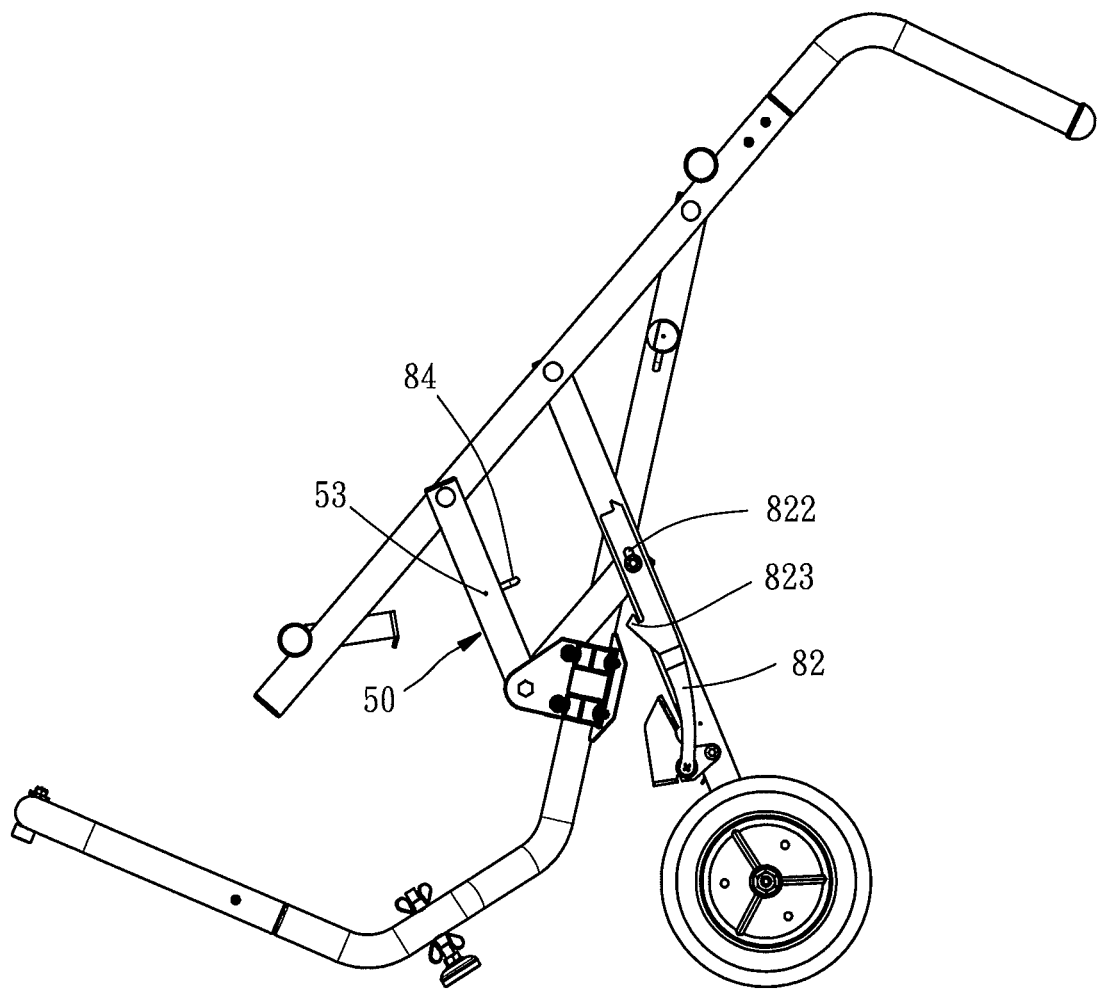
Figure 16:
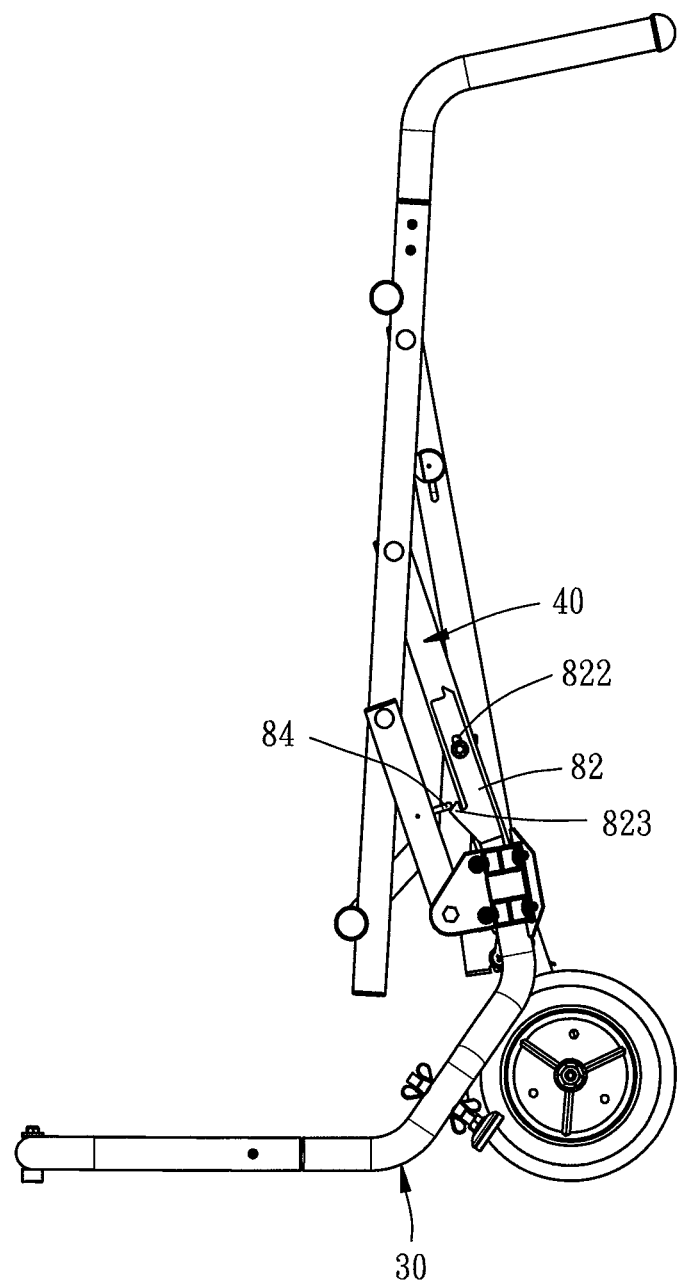
Figure 17:
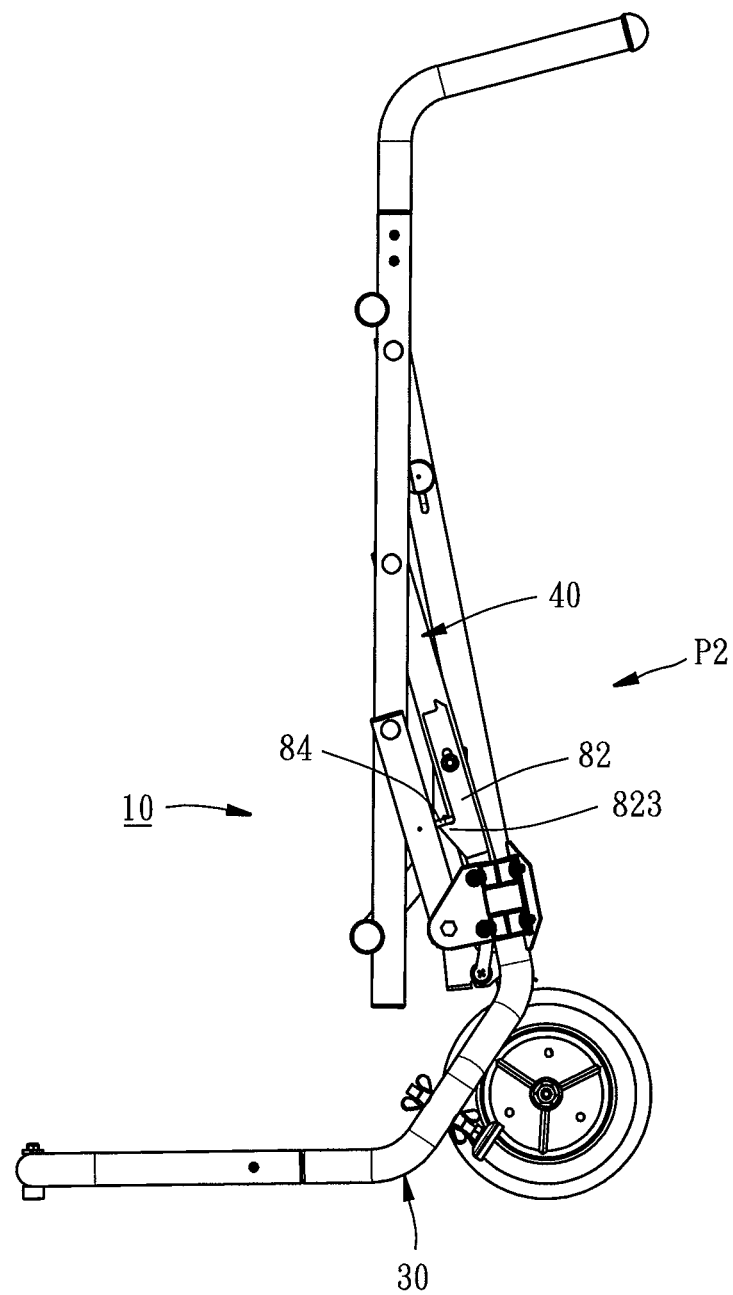

As shown in FIGS. 4-7, a folding mechanism 10 in accordance with a preferred embodiment of the present invention is used for supporting a table machine, for example, table saw 1 above the floor, and it can be alternatively set between an extended position P1 shown in FIG. 8 and a received position P2 shown in FIG. 11. The folding mechanism 10 comprises a rack 20, a pair of first legs 30, a pair of second legs 40, two first links 50, a pair of sliding units 60, two second links 70 and a lock 80.

The rack 20 includes two transverse rods 21 that are spacedly arranged in parallel, and first and second connecting rods 22 and 23 parallel and spacedly arranged across and fixedly connected with the transverse rods 21. Each transverse rod 21 has a front end 24, a rear end 25, and a plurality of pivot points, namely, the first pivot point 211, the second pivot point 212 and the third pivot point 213 spacedly arranged between the front end 24 and the rear end 25. The front end 24 curves downwards, thereby forming a grip 26 for the holding by the user's hand. The first and second connecting rods 22 and 23 are designed for supporting thereon the table machine 1, which is realized as a table saw in this embodiment.

The first legs 30 each have one end, namely a first end respectively pivoted to the first pivot points 211 of the rack 20 at an outer side relative to the transverse rods 21 and the other end, name the second end curved and provided with a bearing portion 31 and a stop portion 32 for contacting the floor. Further, each first leg 30 is provided at a middle thereof with a sliding section 33 adjacent to the first pivot point 211. When the folding mechanism 10 is set in the received position P2, the stop portion 32 is stopped at the floor, thereby supporting the table saw 1 in a vertical posture substantially.

The second legs 40 each have one end, namely a first end respectively pivoted to the second pivot points 212 of the rack 20 at an inner side relative to the transverse rods 21 and the other end, namely a second end rotatably mounted with a wheel 41 for rolling on the floor. Each second leg 22 further has a first connecting point 42 and a second connecting point 43 orderly arranged between the first and second ends of the second leg 22. As shown in FIGS. 8-11, the first legs 30 and the second legs 40 are held in a crossed manner when the folding mechanism 10 is set in the extended position P1. When the folding mechanism 10 is set in the received position P2, the wheels 40 are kept at locations adjacent to the bearing portions 31 of the first legs 30, respectively.

The first links 50 each have a first end 51 and a second end 52. The first ends 51 of the first links 50 are respectively pivoted to the third pivot points 213 of the rack 20 at an outer side relative to the transverse rods 21 and located on a same plane as the first legs 30 do. The first links 50 each have a connecting point 53 between the first end 51 and the second end 52.

The sliding units 60 are slidably sleeved onto the first legs 30, respectively. Each sliding unit 60 has a main body 61 and a pivot portion 62 protruding outwardly from the main body 61. The main body 61 is provided with a receiving space 611 through which the first leg 30 is inserted, and a contact surface 612 configured matching the profile of the first leg 30. The pivot portion 62 has a first pivot point 621 pivotally connected with the second end 52 of the first link 50, and a second pivot point 622 coaxially aligned with the first pivot point 621 in this preferred embodiment of the present invention.

An end of each second link 70 is pivotally connected with the second pivot point 622 of one of the sliding units 60, and the other end of the aforesaid second link 70 is pivotally connected with the first pivot point 42 of one of the second legs 40. As shown in FIG. 8, the first links 50 are substantially kept in parallel to the second legs 40, and the second links 70 are substantially kept in parallel to the transverse rods 21 in such a way that each first link 50 defines with the associated first leg 30 a 90° contained angle.

As indicated above and in FIGS. 8-12, when the folding mechanism 10 is set in the extended position P1, the first legs 30 and the second legs 40 are held in a crossed manner and the rack 20 is substantially stayed at a horizontal posture; at the same time, the first links 50 are substantially kept in normal to the first legs 30 and in parallel to the second legs 40, and the second links 70 are substantially kept in parallel to the transverse rods 21 of the rack 20. When the folding mechanism 10 is operated to change from the extended position P1 toward the received position P2, the second legs 40 are moved along with the first and second links 50 and 70 and the sliding unit 60 toward the first legs 30. When the folding mechanism 10 is set in the received position P2, the wheels 41 are kept close to the bearing portions 31 of the first legs 30 and the rack 20 is kept in a vertical posture substantially.

To operate the folding mechanism 10 from the extended position P1 to the received position P2, the user may lift the grips 26 of the rack 20 with the hands to tilt the table machine 1. In the process of folding the folding mechanism 10, the folding mechanism 10 will receive a force F1 necessary for folding, which is converted from the weight of the table machine 1. By means of controlling the applied force to the grips 26, the tilting speed of the table machine 1 is controlled so as to prevent any potential injury during the folding process. Further, sine the receiving space 611 of the sliding unit 60 surrounds around the sliding section 33 of the first leg 30 and the contact surface 612 of the sliding unit 60 is continuously contacted with the sliding section 33 of the first leg 30, the table machine 1 can be smoothly and slowly changed from the horizontal posture to the vertical posture. Therefore, the user can control the extending and receiving speed of the folding mechanism 10 by oneself, preventing a potential accident due to sudden extending or folding.

Further, an adjusting member 34, which is realized as a threaded bolt in this embodiment, may be mounted to the bearing portion 31 of each first leg 30 for standing on the floor to adjust the elevation of each first leg 30. Each adjusting member 34 has a threaded shank 341 threaded into the associated first leg 30. By means of rotating the adjusting members 34 forwards or backwards relative to the respective first legs 30, the folding mechanism 10 can be kept stably on an uneven ground.

The folding mechanism 10 of the present invention has not only the advantage of labor-saving in operation but also the advantages of convenience and safety when it is operated from the extended position P1 to the received position P2. As shown in FIGS. 13-17, the folding mechanism 10 further comprises a lock 80 to assure safety of the folding mechanism 10 in the received or extended position. The lock 80 includes a pedal 81, a retainer 82, a first bridge member 83 and a second bridge member 84. The pedal 81 has one end pivotally connected with one of the second legs 40, and the other end configured having a press portion 811 which can be stepped by user's foot. The retainer 82 has one end, namely a first end pivotally connected with the pedal 81, and the other end, namely a second end configured having a first hook portion 821. The retainer 82 is provided at a portion that is pivotally connected with the second leg 40 with an elongated guide groove 822, such that the retainer 82 may move along the elongated guide groove 822 by means of the pivotally engaged portion between the retainer 82 and the second leg 40 when the press portion 811 is pressed by the user's foot to cause the pivotal motion of the pedal 81. Further, a second hook portion 823 is provided between the first and second ends of the retainer 82. Two ends of the first bridge member 83 are fixedly and respectively mounted to the first legs 30 in a way that the first bridge member 83 is located above and close to the sliding sections 33. Two ends of the second bridge member 84 are fixedly and respectively mounted to the connecting points 53 of the two first links 50. When the folding mechanism 10 is set in the extended position P1, the first hook portion 821 is hooked on the first bridge member 83 to make sure that the first legs 30 and the second legs are stably kept in a crossed manner, thereby assuring safety use of the folding mechanism 10. When the folding mechanism 10 is set in the received portion P2, the second hook portion 823 is hooked on the second bridge member 84 to assure that the first legs 30 and the second legs 40 are closely abutted together. By means of the aforesaid design, the lock 80 can automatically lock the first legs 30 and the second legs 40 after the folding mechanism 10 has been set in the extended or received position. Simply by pressing the press portion 811 of the pedal 81 with user's foot, the lock 80 can be unlocked, i.e. the engagement between the first hook portion 821 and the first bridge member 83 or the engagement between the second hook portion 823 and the second bridge member 84 can be released for allowing the folding mechanism 10 to be extended out or received. Therefore, safety and convenience in operation can be achieved.

In conclusion, the folding mechanism 10 for supporting thereon a table machine 1 can effectively convert the weight of the table machine 1 that is supported on the folding machine into the force F1 necessary for extending or folding the folding mechanism 10. By means of stably sleeving the sliding unit 60 onto the first leg 30, the extending or folding action can be safely and stably conducted. Because the lock 80 can automatically lock the first legs 30 and the second legs 40 after the folding mechanism 10 has been set in the extended or received position, the operation of the folding mechanism is convenient and safe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A folding mechanism for supporting thereon a table machine, the folding mechanism being alternatively settable between an extended position and a received position, the folding mechanism comprising:

a rack for mounting of the table machine, the rack having a front end, a rear end, and a pair of first pivot points, a pair of second pivot points and a pair of third pivot points, which are orderly and spacedly arranged between the front end and the rear end;

a pair of first legs each having a first end pivoted to one of the first pivot points of the rack, and a second end configured having a bearing portion and a stop portion for supporting on a floor;

a pair of second legs each having a first end pivoted to one of the second pivot points of the rack, and a second end rotatably mounted with a wheel;

a pair of first links each having a first end pivoted to one of the third pivot points of the rack, and a second end;

a pair of sliding units each slidably sleeved onto one of the first legs and provided with a first pivot point pivotally connected with the second end of one of the first links, and a second pivot point; and a pair of second links each having a first end pivoted to the second pivot point of one of the sliding units, and a second end pivoted to one of the second legs;

wherein when the folding mechanism is set in the extended position, the first legs and the second legs are kept in a crossed manner to hold the rack in a horizontal posture substantially; when the folding mechanism is moved from the extended position toward the received position, the first and second links and the sliding units are moved with the second legs toward the second ends of the first legs; when the folding mechanism is set in the received position, the wheels are kept adjacent to the bearing portions of the first legs and the rack is kept in a vertical posture substantially, wherein each of the sliding units comprises a main body and a pivot portion protruding outwardly from the main body; the main body is provided with a receiving space through which one of the first legs is inserted, and a contact surface configured matching the one of the first legs; the pivot portion is provided with said first and second pivot points of the sliding unit; and wherein the first and second pivot points of each of the sliding units are coaxially aligned with each other.

2. The folding mechanism as claimed in claim 1, wherein each of the first links defines with the associated first leg a 90° contained angle when the folding mechanism is in the extended position.

3. The folding mechanism as claimed in claim 1, wherein the rack comprises two transverse rods arranged in parallel, and first and second connecting rods parallel and fixedly arranged across the transverse rods for supporting the table machine; the first, second and third pivot points of the rack are formed on the transverse rods symmetrically and respectively; the first legs and the first links are respectively pivoted to the transverse rods at an outer side of the transverse rods; the second legs are respectively pivoted to the transverse rods at an inner side of the transverse rods relative to the first legs and the first links.

4. The folding mechanism as claimed in claim 3, wherein the first links are substantially kept in parallel to the second legs and the second links are substantially kept in parallel to the transverse rods when the folding mechanism is in the extended position.

5. The folding mechanism as claimed in claim 1, further comprising a lock having a first hook portion for holding the first legs and the second legs in the crossed manner when the folding mechanism is in the extended position, and a second hook portion for holding the first legs and the second legs together when the folding mechanism is in the received position.

6. The folding mechanism as claimed in claim 5, wherein the lock comprises a pedal, a retainer, a first bridge member and a second bridge member; the pedal has one end pivotally connected with one of the second legs, and the other end configured having a press portion to be stepped by a user's foot; the retainer has a first end pivotally connected with the pedal, and a second end configured having the first hook portion and pivotally connected with one of the second legs, such that the first hook portion is moveable in response to a pivotal motion of the pedal; the retainer is provided with the second hook portion between the first and second ends thereof; the first bridge member has two ends fixedly and respectively mounted to the first legs; the second bridge member has two ends fixedly and respectively mounted to the first links; the first hook portion is hooked on the first bridge member when the folding mechanism is in the extended position, and the second hook portion is hooked on the second bridge member when the folding mechanism is in the received portion.

7. The folding mechanism as claimed in claim 6, wherein the retainer of the lock is provided at a portion that is pivotally connected with the second leg with an elongated guide groove.

* * * * *